(12) United States Patent
Hagmann

(10) Patent No.: US 10,401,382 B2
(45) Date of Patent: *Sep. 3, 2019

(54) METHOD OF CARRIER PROFILING IN SEMICONDUCTORS

(71) Applicant: Mark J Hagmann, Salt Lake City, UT (US)

(72) Inventor: Mark J Hagmann, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/928,712

(22) Filed: Mar. 22, 2018

(65) Prior Publication Data

US 2018/0275164 A1    Sep. 27, 2018

Related U.S. Application Data

(60) Provisional application No. 62/474,880, filed on Mar. 22, 2017.

(51) Int. Cl.
*G01Q 30/02* (2010.01)
*G01Q 60/12* (2010.01)

(52) U.S. Cl.
CPC ............ *G01Q 30/02* (2013.01); *G01Q 60/12* (2013.01)

(58) Field of Classification Search
CPC ........ G01Q 60/10; G01Q 60/12; G01Q 60/14; G01Q 60/04; G01Q 60/16
USPC .............................. 850/9, 23, 26, 27, 28, 29
See application file for complete search history.

(56) References Cited

U.S. PATENT DOCUMENTS

| | | | | |
|---|---|---|---|---|
| 9,927,461 | B2* | 3/2018 | Hagmann | G01Q 10/04 |
| 2012/0066799 | A1* | 3/2012 | Esch | G01Q 10/06 |
| | | | | 850/1 |
| 2015/0247809 | A1* | 9/2015 | Hagmann | G01N 22/00 |
| | | | | 850/26 |

* cited by examiner

*Primary Examiner* — Jason L McCormack
(74) *Attorney, Agent, or Firm* — Dobbin IP Law. P.C.; Geoffrey E. Dobbin

(57) ABSTRACT

The superimposition of a periodic potential wave to the tip movement control or the bias supply of an STM, in which a microwave frequency comb is generated in its tunneling junction, may be used to reduce or eliminate artifacts or other noise generated from outside the tunneling junction.

4 Claims, 1 Drawing Sheet

METHOD OF CARRIER PROFILING IN SEMICONDUCTORS

CROSS-REFERENCES TO RELATED APPLICATIONS

This Application claims priority as a non-provisional perfection of prior filed U.S. Application 62/474,880, filed Mar. 22, 2017, and incorporates the same by reference in its entirety herein.

FIELD OF THE INVENTION

The present invention relates to the field of semiconductor profiling and more particularly relates to the application of a modulating potential to the circuitry of a profiling assembly so as to enable the use of more general mode-locked lasers (active or passive) having an arbitrary carrier frequency and also to enable a greater signal-to-noise ratio.

BACKGROUND OF THE INVENTION

The use of a mode-locked ultrafast laser to generate a microwave frequency comb (MFC) in the tunneling junction of a scanning tunneling microscope has been described by this Inventor [M. J. Hagmann, A. J. Taylor and D. A. Yarotski, Observation of $200^{th}$ harmonic with fractional linewidth of $10^{-10}$ in a microwave frequency comb generated in a tunneling junction," Applied Physics Letters 101 (2012) 241102]. The inventor has also described how measurements of the MFC, as it propagates into a semiconductor as the sample electrode, may be used to determine the carrier density in a small region of the semiconductor that is close to the tunneling junction [M. J. Hagmann, P. Andrei, S. Pandey and A. Nahata, "Possible applications of scanning frequency comb microscopy for carrier profiling in semiconductors," journal of Vacuum Science and Technology B 33 (2015) 02B109; and, U.S. application Ser. No. 15/448,151, filed 2 Mar. 2017, both of which are incorporated by reference herein in their entirety]. These previous disclosures all had two fundamental limitations.

The first limitation is that in previous studies of the MFC using a semiconductor as the sample electrode it was necessary to use lasers having a photon energy lower than the bandgap energy of the semiconductor. Otherwise electron-hole pairs form and separate to cause surge currents at the same frequencies as the harmonics of the MFC. For example, a Ti:Sapphire laser was used with metal samples or gallium nitride but an infrared laser is required with a silicon sample. [M. J. Hagmann, S. Pandey, A. Nahata, A. J. Taylor and D. A. Yarotski, "Microwave frequency comb attributed to the formation of dipoles at the surface of a semiconductor by a mode-locked ultrafast laser," Applied Physics Letters 101 (2012) 231102]. The surge currents are independent of the tunneling process and have harmonics with greater power than those of the MFC because they are generated over the much larger surface of the semiconductor sample when it is exposed to the laser radiation.

The second limitation is that in previous studies of the MFC it was necessary to use lasers that are passively mode-locked, such as with a saturable absorber, Kerr-lens mode-locking, or with other nonlinear optical effects, so that no electrical signal is present at the laser pulse repetition frequency. By contrast, in active mode-locking an electrical signal at the pulse-repetition frequency is applied to an acousto-optic modulator or other device to modulate the laser. The different harmonics of the MFC typically have a power from −120 to −152 dBm at harmonics with progressively higher frequencies. However, the harmonics of the MFC may be measured with high accuracy because the signal-to-noise ratio is approximately 25 dB due to their extremely narrow (sub-Hz) linewidth. Nevertheless, with active mode-locking the leakage of the modulating electrical signal prevents measurements of the harmonics of the MFC.

In addition, the use of a modulating potential increases the signal-to-noise ratio and provide greater sensitivity greater precision in measuring the MFC. This allows operation of the STM at lower tunneling currents and cause less perturbation to the structure of the semi-conductor. This should be understood by those skilled in the art of phase-sensitive detection The present invention is an improvement to the apparatus generating and measuring the MFC to allow for the use more general mode-locked lasers (active or passive) having an arbitrary carrier frequency.

SUMMARY OF THE INVENTION

In view of the foregoing disadvantages inherent in the known types of carrier profiling methodologies (e.g. scanning spreading resistance microscopy and scanning capacitance microscopy), an improved methodology may broaden the types of laser used in the profiling method. In the improvement, the MFC is modulated by superimposing a time-varying potential (preferably sinusoidal) on either (1) the voltage controlling the axial motion of the actuator, which may be a piezoelectric actuator, which moves the tip electrode, or (2) the DC bias voltage which is applied to the tunneling junction and part of the semiconductor in series. Said superimposed time-varying potential causes a measurable change in the MFC which may be used to mitigate the effects of the prior art limitations.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein are for description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

With reference now to the drawings, an improvement to scanning tunneling microscopy and carrier profiling is described. It should be noted that the articles "a", "an", and "the", as used in this specification, include plural referents unless the content clearly dictates otherwise.

Figure 1:
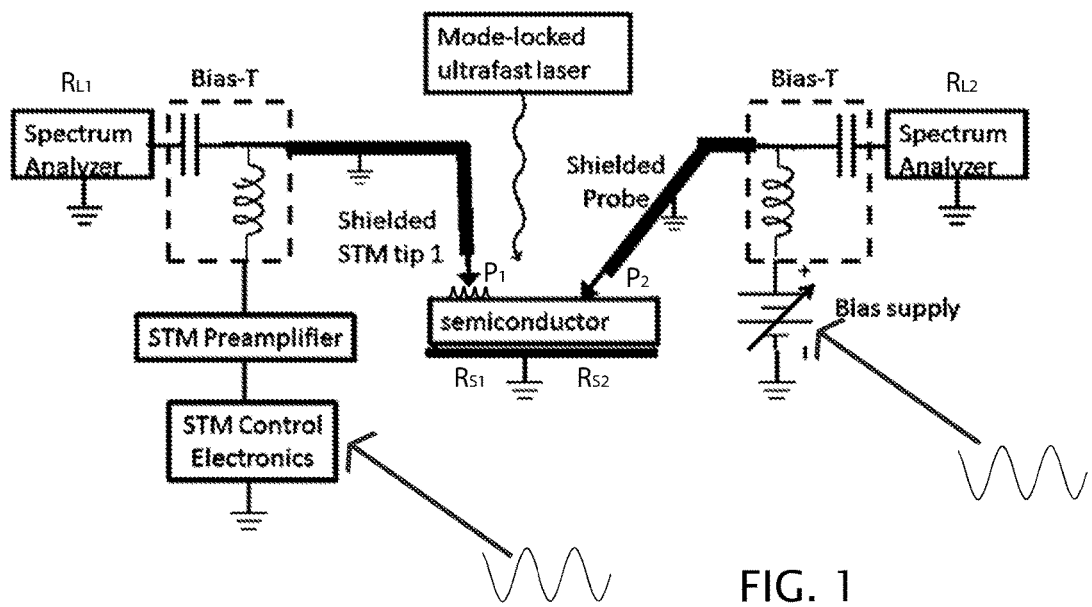
FIG. 1 is a schematic showing one scanning tunneling microscope ("STM") configuration utilizing the invention.
Figure 2:
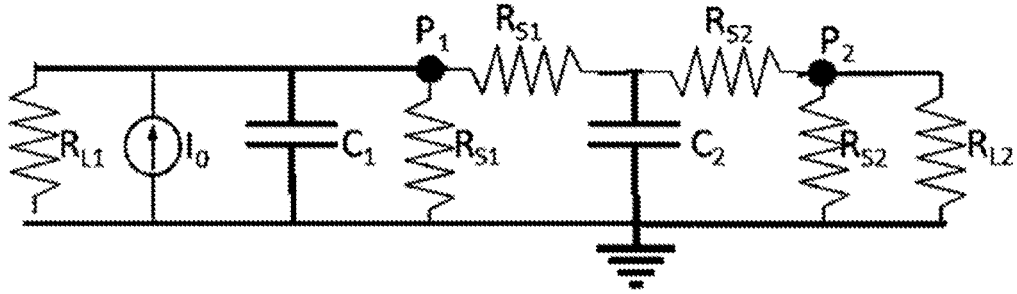
FIG. 2 is a diagram of an equivalent circuit to the configuration shown in FIG. 1.

FIG. 1 is a sketch of one possible implementation of the apparatus for practicing the art of this invention. A STM is provided with control electronics and a preamplifier. The control electronics position a shielded STM tip by operable actuators. The tip ($P_1$) is proximate to, but not touching, a grounded semiconductor sample, thus forming a tunneling junction, while a shielded probe ($P_2$) is positioned on the sample proximate to the tip. A microwave detector, such as a spectrum analyzer ($R_{L2}$), is also provided in the sample circuit, as is a bias supply. Ideally, but not necessarily, a second microwave detector is provided in the tip circuit, such as the second spectrum analyzer ($R_{L1}$) in FIG. 1. A mode locked laser is made to project a beam onto the semiconductor sample to generate the MFC in the tunneling junction between the tip and sample. An equivalent circuit of the same is shown in FIG. 2. In these Figures, $R_{L1}$ of the equivalent circuit is shown as a spectrum analyzer but either a bias-T or a directional coupler combined with and a load resistor could also be used with a spectrum analyzer as $R_{L1}$. Likewise, a sensitive microwave receiver could be used in place of either spectrum analyzer as a microwave detector.

To make accurate microwave measurements it is necessary that the microwave energy be coupled from the semiconductor using a microwave transmission line, such as semi-rigid miniature coaxial cable. Use of such cable in the STM tip and the probe provides such coupling. This is not generally done in a scanning tunneling microscope, but the art for doing this has already been described in U.S. Pat. No. 9,075,081, which is incorporated herein by reference in its entirety.

Figure 3A:
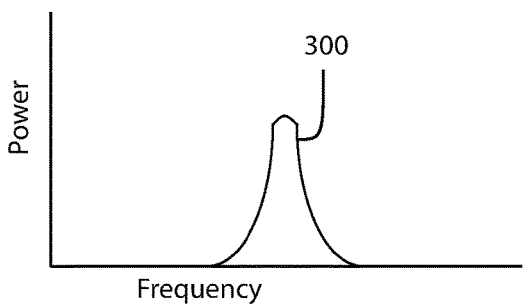
FIG. 3A is a schematic graph (power over frequency) depicting a single harmonic in a microwave frequency comb.
Figure 3B:
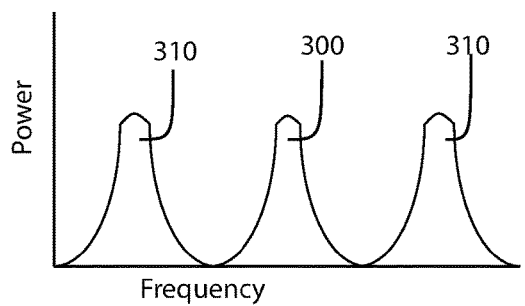
FIG. 3B is a schematic graph of the single harmonic of FIG. 3A, and added sidebands resulting from applying a modulating, cyclical potential to the STM.

A cyclical potential may be applied to either the tip control electronics or the bias supply in the sample circuit, as shown by the two waveforms in FIG. 1. This cyclical potential is ideally sinusoidal but may be of other regular cyclical waves. Without the cyclical potential, a single harmonic 300 (FIG. 3A) can be isolated and examined; but, for the case where the applied potential is sinusoidal (FIG. 3B) said modulation will cause sidebands 310 at each harmonic 300. Thus, for a superimposed time-varying potential at a frequency of 1 kHz, there will be sidebands 310, proportional to and somewhat broader than the harmonics, at 1 kHz above and below the frequency at each of the harmonics in the MFC. Then the carrier profiling of semiconductors may be based on the sidebands 310 for each harmonic instead of the harmonics 300 themselves. If a simple, sensitive microwave receiver is used rather than a spectrum analyzer, feedback control may be used to shift the periodic potential to maximize output.

Excellent shielding is required to limit the effects of the superimposed time-varying potential on sections of the apparatus other than where this potential is intended.

In different applications, it may be preferable to superimpose the time-varying potential at one or the other of the two points already noted (the actuator controls or the DC bias voltage). For example, in general the time-varying potential could have a smaller amplitude at the actuator which would reduce the interference at other sections of the apparatus. Also, applying the time-varying potential to the actuator may provide greater mitigation of the effects of the surge currents. This is because the bias is applied across a small section of the semiconductor containing the surge currents as well as the tunneling junction. By eliminating the effects of surge currents, the present invention enables the use of more standard Ti:sapphire lasers in place of infrared lasers with silicon. An entire sample may then be profiled by simply moving the STM tip and the probe relative to the sample in a manner to cover the entire sample, while maintaining the relative distance of the STM tip and probe from each other. The localized spreading resistance of the semiconductor sample at the tunneling junction is then determined from the measured power at the sidebands of the harmonic, as is described for the harmonic in the prior incorporated patents. This spreading resistance then corelates to the carrier concentration in the sample.

Although the present invention has been described with reference to preferred embodiments, numerous modifications and variations can be made and still the result will come within the scope of the invention. This methodology may be used to reduce or eliminate any type of noise or other artifacts which may be generated outside of the tunneling junction. No limitation with respect to the specific embodiments disclosed herein is intended or should be inferred.

What is claimed is:

1. A method to determine carrier concentration of a semiconductor sample, the method comprising:
    a. placing the semiconductor sample in a scanning tunneling microscope ("STM"), the STM comprising: tip control electronics, a tip circuit with a preamplifier, a tip-side microwave detector, and a shielded STM tip, the shielded STM tip being in proximity with, but not in contact with, the semiconductor sample, forming a tunneling junction;
    b. placing a shielded probe in contact with the semiconductor sample in proximity to the STM tip, the shielded probe having functional connection with a bias supply and a probe-side microwave detector, forming a probe circuit, the probe circuit and tip circuit forming a system;
    c. applying a periodic potential wave to the tip control electronics
    d. irradiating the sample with a mode-locked ultrafast laser, generating a microwave frequency comb in the tunneling junction;
    e. measuring the microwave frequency comb's power at sidebands of a given harmonic of the microwave frequency comb with the microwave detector;
    f. determining the localized spreading resistance of the semiconductor sample at the tunneling junction from the measured power;
    g. using data from repeated measurements at different locations on the semiconductor sample to determine carrier concentration of the semiconductor sample
    wherein the tip-side microwave detector and the probe-side microwave detector are used to measure attenuation of the microwave frequency comb.

2. The method of claim 1, the microwave detector being selected from the set of microwave detectors consisting of: a spectrum analyzer and a microwave receiver.

3. A method to determine carrier concentration of a semiconductor sample, the method comprising:
 a. placing the semiconductor sample in a scanning tunneling microscope ("STM"), the STM comprising a tip circuit with a preamplifier, a tip-side microwave detector, and a shielded STM tip, the shielded STM tip being in proximity with, but not in contact with, the semiconductor sample, forming a tunneling junction;
 b. placing a shielded probe in contact with the semiconductor sample in proximity to the STM tip, the shielded probe having functional connection with a bias supply and a probe-side microwave detector, forming a probe circuit, the probe circuit and tip circuit forming a system;
 c. applying a periodic potential wave to the bias supply;
 d. irradiating the sample with a mode-locked ultrafast laser, generating a microwave frequency comb in the tunneling junction;
 e. measuring the microwave frequency comb's power at sidebands of a given harmonic of the microwave frequency comb with the microwave detector;
 f. determining the localized spreading resistance of the semiconductor sample at the tunneling junction from the measured power;
 g. using data from repeated measurements at different locations on the semiconductor sample to determine carrier concentration of the semiconductor sample
 wherein the tip-side microwave detector and the probe-side microwave detector are used to measure attenuation of the microwave frequency comb.

4. The method of claim 3, the microwave detector being selected from the set of microwave detectors consisting of: a spectrum analyzer and a microwave receiver.

\* \* \* \* \*